US 11,180,175 B2

(12) United States Patent
Desai et al.

(10) Patent No.: US 11,180,175 B2
(45) Date of Patent: Nov. 23, 2021

(54) CHILD CARRIER

(71) Applicant: RSG Innovations Limited, Warwickshire (GB)

(72) Inventors: Rajesh Desai, Birmingham (GB); Graham Kingett, Droitwich (GB)

(73) Assignee: RSG INNOVATIONS LIMITED, Warwickshire (GB)

(*) Notice: Subject to any disclaimer, the term of this patent is extended or adjusted under 35 U.S.C. 154(b) by 0 days.

(21) Appl. No.: 16/608,729

(22) PCT Filed: Apr. 26, 2018

(86) PCT No.: PCT/GB2018/051091
§ 371 (c)(1),
(2) Date: Oct. 26, 2019

(87) PCT Pub. No.: WO2018/197875
PCT Pub. Date: Nov. 1, 2018

(65) Prior Publication Data
US 2020/0189640 A1 Jun. 18, 2020

(30) Foreign Application Priority Data

Apr. 27, 2017 (GB) .................................. 1706750.5

(51) Int. Cl.
B62B 7/12 (2006.01)
A47D 1/02 (2006.01)
(Continued)

(52) U.S. Cl.
CPC ................ B62B 7/12 (2013.01); A47D 1/023 (2017.05); A47D 1/06 (2013.01); A47D 13/025 (2013.01);
(Continued)

(58) Field of Classification Search
CPC  B62B 7/12; B62B 7/066; B62B 7/142; B62B 5/0023; B62B 2206/006;
(Continued)

(56) References Cited

U.S. PATENT DOCUMENTS 3,984,115 A * 10/1976 Miller .................. A47D 13/025
280/30
4,641,844 A * 2/1987 Mar ..................... A47D 13/025
280/30
(Continued)

FOREIGN PATENT DOCUMENTS

WO 2014057238 A1 4/2014
WO 2015003227 A1 1/2015

OTHER PUBLICATIONS

Search Report and Examination Opinion issued in GB Application No. 1706750.5, dated Sep. 25, 2017, 3 pages.
(Continued)

Primary Examiner — Erez Gurari
(74) Attorney, Agent, or Firm — Polsinelli PC

(57) ABSTRACT

A child carrying device comprising a frame mounted on a set of wheels or castors to enable the device to be manually conveyed thereon, and a seat mounted on said frame, said device including adjustment means for selectively reconfiguring the device such that it is operable as any one of a stroller, a child back carrier and a high chair.

8 Claims, 13 Drawing Sheets

(51) Int. Cl.
*A47D 1/06* (2006.01)
*A47D 13/02* (2006.01)
*B62B 7/06* (2006.01)
*B62B 7/14* (2006.01)
*B62B 5/00* (2006.01)

(52) U.S. Cl.
CPC .............. *B62B 7/066* (2013.01); *B62B 7/142* (2013.01); *B62B 5/0023* (2013.01); *B62B 2206/006* (2013.01); *B62B 2206/06* (2013.01)

(58) Field of Classification Search
CPC ...... B62B 2206/06; A47D 1/023; A47D 1/06; A47D 13/025
See application file for complete search history.

(56) References Cited

U.S. PATENT DOCUMENTS

| | | | | |
|---|---|---|---|---|
| 4,762,256 A | * | 8/1988 | Whitaker | A45F 3/10 224/161 |
| 5,230,523 A | * | 7/1993 | Wilhelm | B62B 7/12 280/30 |
| D394,546 S | * | 5/1998 | Svendsen | D3/214 |
| 6,142,491 A | * | 11/2000 | Darling, III | B62B 5/0023 280/30 |
| 8,020,879 B1 | * | 9/2011 | Engdahl | B62B 9/14 280/30 |
| 8,876,146 B2 | * | 11/2014 | Smith, Jr. | B62B 7/062 280/642 |
| 8,894,089 B2 | * | 11/2014 | Clifton | B62B 9/26 280/642 |
| 9,168,941 B2 | * | 10/2015 | Millman-Wood | B62B 7/12 |
| 10,427,558 B1 | * | 10/2019 | Dickens | B60N 2/2848 |
| 2003/0192925 A1 | * | 10/2003 | Boone | B60N 2/2842 224/161 |
| 2004/0145133 A1 | * | 7/2004 | Lee | B62B 7/02 280/30 |
| 2005/0110231 A1 | * | 5/2005 | Brown | B62B 3/027 280/47.26 |
| 2008/0042379 A1 | * | 2/2008 | Amran | B62B 5/0023 280/30 |
| 2008/0129001 A1 | * | 6/2008 | Emerson | B62B 7/145 280/30 |
| 2013/0140797 A1 | * | 6/2013 | Fritz | B62B 9/245 280/649 |
| 2014/0183843 A1 | * | 7/2014 | Iftinca | B62B 9/104 280/647 |
| 2014/0265255 A1 | * | 9/2014 | Wang | B60N 2/2848 280/643 |
| 2016/0046315 A1 | * | 2/2016 | Zehfuss | B62B 7/062 280/33.993 |
| 2016/0128491 A1 | * | 5/2016 | Martiniuk | B62B 9/24 280/47.41 |
| 2018/0146757 A1 | * | 5/2018 | Johar | B62B 7/12 |
| 2018/0273075 A1 | * | 9/2018 | Miles | B62B 7/086 |
| 2020/0345155 A1 | * | 11/2020 | Rendinaro | A45C 13/28 |

OTHER PUBLICATIONS

International Search Report and Written Opinion issued in International Application No. PCT/GB2018/051091, dated Jul. 31, 2018, 14 pages.

\* cited by examiner

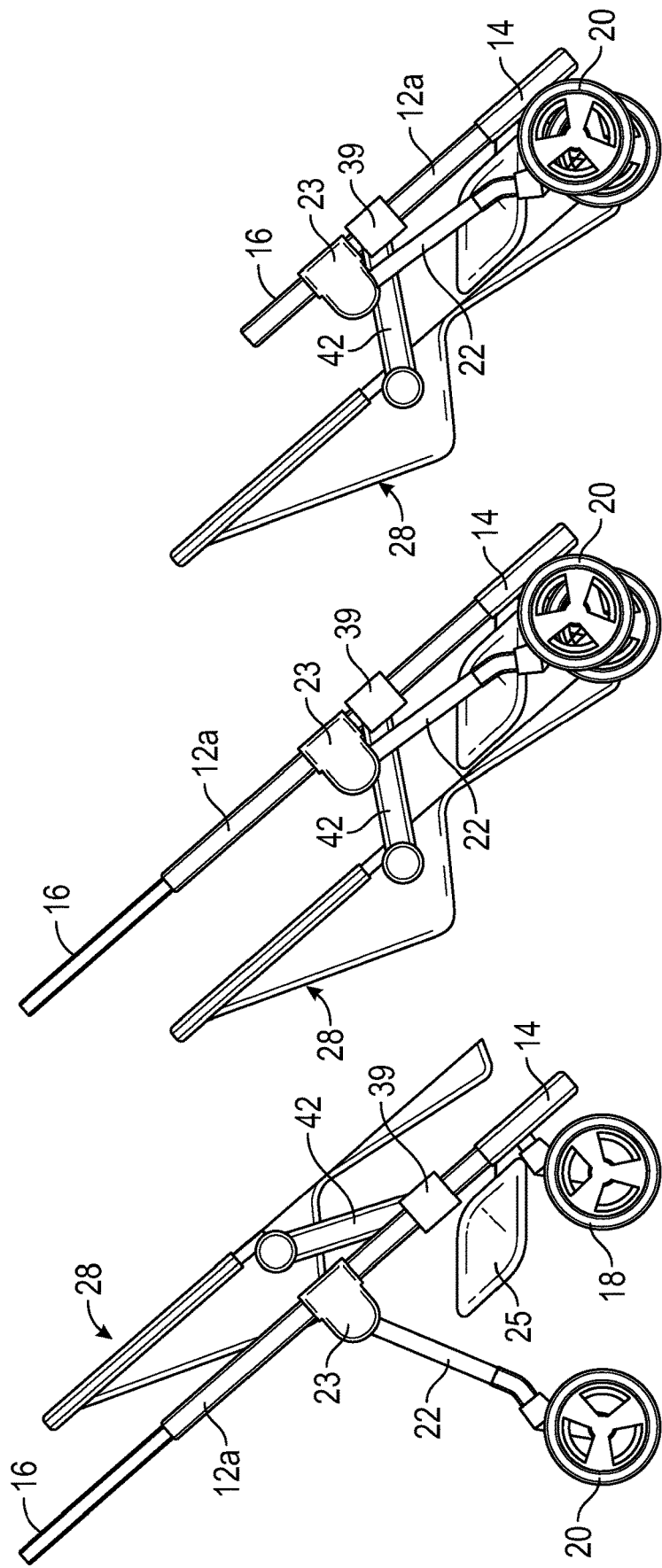

CHILD CARRIER

CROSS-REFERENCE TO RELATED APPLICATION

This application is a U.S. 371 National Stage Application of International Application No. PCT/GB2018/051091, filed Apr. 26, 2018, which claims the benefit of Great Britain Application No. GB 1706750.5, filed Apr. 27, 2017, both of which are herein incorporated by reference in their entireties.

FIELD OF THE INVENTION

This invention relates generally to a child carrier and, more particularly but not necessarily exclusively, to a collapsible child carrying device that can be selectively configured to perform two or more child carrying functions.

BACKGROUND OF THE INVENTION

Various child carrying devices are well known and in widespread use. For example, strollers are known, which typically comprise a main frame mounted on a set of ground-engaging wheels, with a seat mounted within the main frame for receiving a child, and a handle to enable a user to manually convey the stroller to transport the child.

Child back carriers are also known, which comprise a seat region for receiving a child, and a harness for enabling a user to strap the device onto their shoulders and back such that the child can be carried thereon.

Furthermore, high chairs are known, which comprise an upright seat, mounted on a frame and configured to support a child at a height convenient for feeding and/or sitting at the table.

All of these child carrying devices are useful in different circumstances, and in general it is usual for parents to have at least two, if not all three, of these types of products. However, even though these devices tend to be collapsible to a generally flat configuration for storage and transportation purposes, they still tend to be quite large and bulky, making it impractical to travel, for example, with any more than one of them. Typically, the stroller would be selected, but this means that their child transportation ability is limited to areas and terrains where the stroller can be used. Furthermore, conventional strollers do not function adequately as a feeding chair as the seat is not usually sufficiently high, nor is it oriented optimally to allow the child to eat comfortably.

U.S. Pat. No. 4,762,256 describes a stroller that can be converted into a child back carrier. However, not only is the described reconfiguration process between the two functions complex and time consuming, the device still cannot function adequately as a feeding chair. Strollers are also known, wherein the seat is mounted on a rotating hub such that it can be selectively rotated, relative to the frame, from a forward facing position (for transporting the child) to a side facing position (so that the child can, for example, face a table at which its carers are sitting) without having to move the stroller frame itself. However, there is no height adjustment of the seat provided, such that it cannot really function as a high chair as such. Furthermore, there is no means, other than the normal brakes, to prevent the wheels, and therefore the frame, from moving. Still further, although the stroller is collapsible, the rotating hub in the centre means that it is still relatively large and bulky, even in its folded configuration.

It would, therefore, be desirable, to provide a collapsible, multi-functional child carrying device that would be particularly, although not necessarily exclusively, suitable for travelling with a young child.

SUMMARY OF THE INVENTION

In accordance with a first aspect of the present invention, there is provided a child carrying device comprising a frame mounted on a set of wheels or castors to enable the device to be manually conveyed thereon, and a seat mounted on said frame, said device including adjustment means for selectively reconfiguring the device such that it is operable as any one of a stroller, a child back carrier and a high chair.

In an exemplary embodiment of the invention, the frame may have an upper end and a lower end and is oriented at a rearward angle from said lower to said upper end when the device is oriented for use, with a handle member being mounted at said upper end. The handle member may be selectively extendible and retractable relative to said frame.

Optionally, a planar foot plate may be provided at the bottom end of said frame. A first one or more front wheels or castors may be mounted at said lower end of said frame. One or more front wheels or castors may be mounted, via a rotatable coupling means, to a rear surface of said foot plate, wherein said rotatable coupling means is configured to enable a respective wheel or castor to be rotated from an operable configuration to a folded configuration in which its principal plane is substantially parallel and adjacent to the rear surface of the foot plate.

In an exemplary embodiment, one or more rear wheels or castors may be provided at a distal end of a respective one or more support legs, said one or more support legs being coupled at the other end to the frame and extending downwardly therefrom at an angle to the longitudinal axis thereof when in an operable configuration. Indeed, in a preferred exemplary embodiment, the device may comprise a pair of rear wheels or castors, each said rear wheel or castor being mounted at a distal end of a respective support leg, wherein each support leg is coupled at the other end to a respective side of the frame, at a first intermediate location along its length, and extending downwardly and rearwardly therefrom at an angle to the longitudinal axis thereof when in an operable configuration.

Optionally, the or each support leg may be pivotally coupled to the frame and configured to be selectively pivoted from said operable configuration to a second configuration in which the support leg(s) is/are substantially parallel and adjacent to a longitudinal dimension of the frame.

In an exemplary embodiment, the frame may comprise a pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto.

Optionally, the seat may be mounted to said frame by means of at least one link arm that is rotatably coupled at one end thereof to said seat and rotatably coupled at the other end thereof to said frame such that the longitudinal axis thereof is selectively angularly adjustable relative to said frame to enable the relative position and/or orientation of said seat to be selectively adjusted so as to reconfigure the device to be operable as any one of a stroller, child back carrier or high chair respectively. In a preferred exemplary embodiment, the seat may be mounted to said frame by means of a pair of link arms, each link arm being rotatably coupled at one end thereof to a respective side of the seat and rotatably coupled at the other end thereof to a respective side of the frame at a second intermediate location along its length. Optionally, the other end of each link arm may be rotatably connected to a fixed cuff member mounted on said frame.

The frame may comprise a pair of parallel and spaced apart side bars, and each said support leg may be coupled to a respective side bar by means of a fixed cuff member at said first intermediate location along its length.

Optionally, the seat may be mounted to said frame by means of a pair of link arms, each link arm being rotatably coupled at one end thereof to a respective side of the seat and rotatably coupled at the other end thereof to a respective side of the frame at a second intermediate location along its length, and wherein said second intermediate location is lower than said first intermediate location on said frame.

In a specific exemplary embodiment, the frame may comprise a pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto, a first fixed cuff member is mounted at said open tubular end of each said first elongate section and the other end of a respective link arm is rotatably connected to each said first fixed cuff member, and wherein the device comprises comprising a pair of rear wheels or castors, each said rear wheel or castor being mounted at a distal end of a respective support leg and each support leg being coupled at the other end to a second fixed cuff member mounted on the second elongate section of a respective side bar of said frame and extending downwardly and rearwardly therefrom at an angle to the longitudinal axis thereof when in an operable configuration, said second fixed cuff defining the maximum amount by which said second elongate section can be retracted relative to said first elongate section.

Optionally, a bracing member may extend between said support legs. The bracing member may be of a substantially inverted U shape.

In accordance with a second aspect of the present invention, there is provided a child carrying device comprising a frame mounted on a set of wheels or castors to enable the device to be manually conveyed thereon, and a seat mounted on said frame, wherein said frame comprises a pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto, wherein one or more rear wheels or castors is provided at a distal end of a respective one or more support legs, said one or more support legs being coupled at the other end to the frame and extending downwardly therefrom at an angle to the longitudinal axis thereof when in an operable configuration, the or each support leg being pivotally coupled to the frame and configured to be selectively pivoted from said operable configuration to a second configuration in which the support leg(s) is/are substantially parallel and adjacent to a longitudinal dimension of the frame, and wherein said seat is mounted to said frame by means of a pair of link arms, each link arm being rotatably coupled at one end thereof to a respective side of the seat and rotatably coupled at the other end thereof to an elongate section of a respective side bar of the frame, said device being selectively reconfigurable such that it is operable in any one of a stroller, a child back carrier and a high chair mode, wherein in said stroller mode, said support leg(s) is/are in said operable mode, said second elongate section of each side bar is extended relative to the respective first elongate section, and said link arms extend from the front of the frame at a first angle relative to its longitudinal axis; in said back carrier mode, said support leg(s) is/are in said second configuration, said second elongate section of each side bar of said frame is fully retracted relative to the first elongate section and said link arms extend rearwardly from said frame at an angle to the longitudinal axis thereof; and in said high chair mode, said support leg(s) is/are in said operable mode, said second elongate section of each side bar of said frame is retracted relative to said first elongate section, and said link arms extend from the front of the frame at a second angle, greater than the first angle, relative to the longitudinal axis thereof.

The seat may comprise a backrest, a seat portion and a seat liner, said seat liner comprising first and second integral portions, said first seat liner portion being configured to line the backrest and said second seat liner portion being configured to line said seat portion when the device is operable as a stroller, the seat liner further comprising a pair of strap members connected to said second seat liner portion and being configured to be releasably connected to said first seat liner portion when said device is operable as a child back carrier to form a sling-like seat for receiving a child.

In accordance with a third aspect of the present invention, there is provided a child carrying device comprising a frame mounted on a set of wheels or castors to enable the device to be manually conveyed thereon, and a seat mounted on said frame, wherein said frame comprises a pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto, wherein one or more rear wheels or castors is provided at a distal end of a respective one or more support legs, said one or more support legs being coupled at the other end to the frame and extending downwardly therefrom at an angle to the longitudinal axis thereof when in an operable configuration, the or each support leg being pivotally coupled to the frame and configured to be selectively pivoted from said operable configuration to a second configuration in which the support leg(s) is/are substantially parallel and adjacent to a longitudinal dimension of the frame, and wherein said seat is mounted to said frame by means of a pair of link arms, each link arm being rotatably coupled at one end thereof to a respective side of the seat and rotatably coupled at the other end thereof to an elongate section of a respective side bar of the frame, said device being selectively reconfigurable such that it is operable in either a stroller or a child back carrier mode, wherein in said stroller mode, said support leg(s) is/are in said operable mode, said second elongate section of each side bar is extended relative to the respective first elongate section, and said link arms extend from the front of the frame at a first angle relative to its longitudinal axis; and in said back carrier mode, said support leg(s) is/are in said second configuration, said second elongate section of each side bar of said frame is fully retracted relative to the first elongate section and said link arms extend rearwardly from said frame at an angle to the longitudinal axis thereof.

BRIEF DESCRIPTION OF THE DRAWINGS

These and other aspects of the present invention will be apparent from the following specific description, in which an embodiment of the invention is described, by way of example only, and with reference to the accompanying drawings, in which:

FIGS. 4A to 4D are schematic side views of the device of FIG. 1 illustrating the reconfiguration process thereof from a stroller mode to a child back carrier mode;

DETAILED DESCRIPTION

Figure 1:
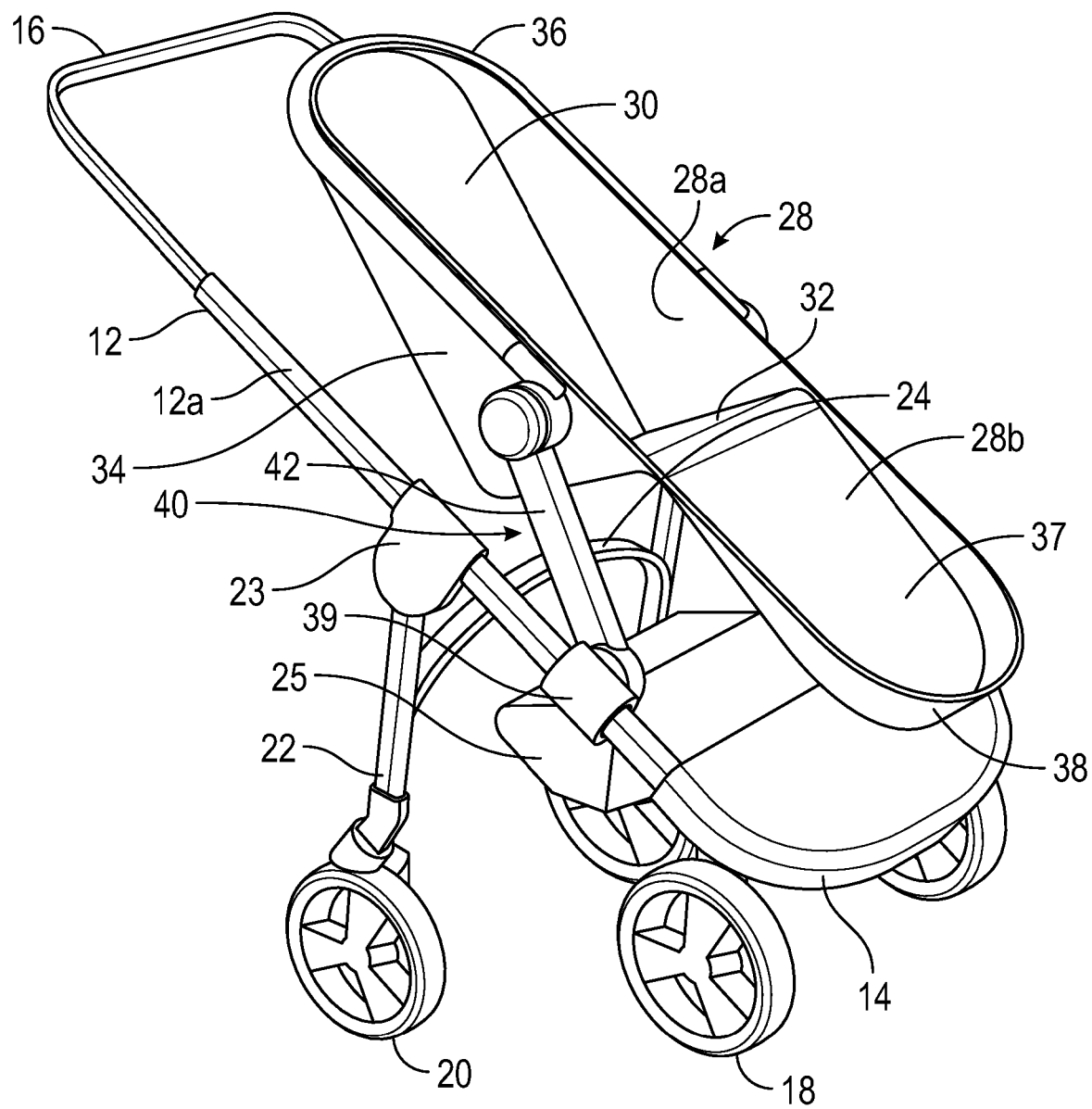
FIG. 1 is a schematic perspective view of a child carrying device according to an exemplary embodiment of the present invention, when in the stroller configuration.

Referring to FIG. 1 of the drawings, a child carrying device according to an exemplary embodiment of the present invention is illustrated, comprising a frame 12 mounted on a set of ground-engaging wheels. The frame 12 comprises a pair of elongate, spaced apart and parallel side bars 12*a* coupled together at a lower end by a rigid, substantially planar foot plate 14 extending between the lower distal ends of the side bars 12*a*; and coupled together at the opposing upper end by a handle member 16 which is of a generally inverted U-shaped configuration. The side bars 12*a* are tubular and the free ends of the handle member 16 are also generally tubular and of a diameter slightly less than the inner diameter of the tubular side bars 12*a*. The free ends of the handle member 16 are telescopically mounted within respective upper ends of the side bars 12*a* and configured for slidable movement relative thereto. Means (not shown) are provided to lock the handle member 16 in a desired position relative to the side bars 12*a*. Each side bar 12*a* itself comprises a pair of telescopically coupled side bar sections, an upper side bar section and a lower side bar section, the upper side bar section being telescopically mounted in the respective lower side bar section, for slidable movement relative thereto, such that it can be retracted or extended as required for use. Once again, means (not shown) are provided for locking the upper side bar portion in a desired position relative to the lower side bar section for use.

Thus, the side bars 12*a*, the foot plate 14 and the handle member 16 together form a generally rectangular main frame. The end of the main frame defined by the foot plate 14 will hereinafter be referred to as the lower end, and the end of the main frame defined by the handle member 16 will hereinafter be referred to as the upper end. However, it is to be understood that the terms "upper" and "lower", and indeed any other directional or orientational terms, are used herein with reference to the orientation and configuration in which the device is intended to be used, and are not intended to confer any other limitation. The device, as illustrated in FIG. 1, is shown in the stroller configuration and the main frame is angled rearwardly (relative to the intended direction of travel, in use) from the lower end to the upper end.

Figure 1A:
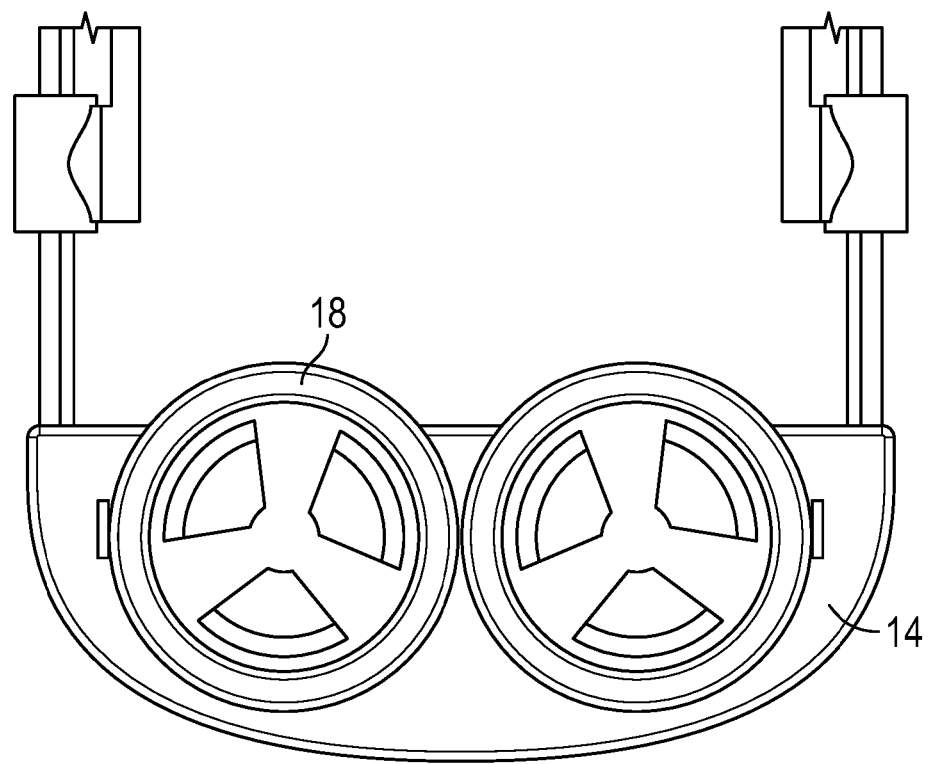
FIG. 1A is a schematic close-up rear view of the footplate of the device of FIG. 1, illustrating the front wheels in a 'folded' configuration.

The main frame is mounted, at the lower end, on a pair of laterally spaced apart wheels, hereinafter referred to as the front wheels. Each front wheel 18 is mounted on its own respective axle at the rear of the foot plate 14, the front wheels 18, when in their operable configuration, having a common axis of rotation that extends laterally (horizontally when the device is oriented for use) across the lower end of the main frame. The front wheels 18 are mounted on a folding mechanism (not shown) configured to allow them to be rotated, from the operable configuration, through substantially 90° inwardly (about an axis generally parallel to the longitudinal axis of the side bars 12*a* and toward the rear surface of the foot plate 14) such that their principal plane is substantially parallel to the rear surface of the foot plate 14 and they lie substantially flat against that surface, as shown in FIG. 1A of the drawings. Various mechanisms are known for allowing a rotating element, such as a wheel or castor, to be locked into defined positions in this manner. For example, a sprung plunger may be utilised, that could be manually released, or even automatically released via a cable system (during reconfiguration of the device). However, other suitable mechanisms for achieving this functionality will be apparent to a person skilled in the art, and the present invention is not necessarily intended to be limited in this regard.

A second pair of wheels, hereinafter referred to as the rear wheels, is provided at the rear of the device. Each rear wheel 20 is mounted at a first end of an elongate support leg 22. The opposing (upper) end of each support leg 22 is pivotally mounted to a first fixed cuff 23 provided around the respective side bar 12*a* at a location generally central between its upper and lower ends, for pivotal movement between a first, operable position in which the respective support leg 22 extends rearwardly at an angle less than 90° from the respective side bar 12*a*, and a second, folded position in which the respective support leg 22 lies generally parallel and adjacent to the respective side bar 12*a*. In the operable position illustrated in FIG. 1, the front wheels 18 and the rear wheels 20 engage with the ground on a common plane, and the lateral distance between the inner planes of the rear wheels 20 is slightly larger than the lateral width of the foot plate 14 (and, indeed, the lateral distance between the front wheels 18). A bracing member 24 extends between the support legs 22. In the illustrated embodiment, the bracing member 24 is an arched member (of general inverted U shape), but the present invention is not necessarily intended to be limited in this regard.

A shopping basket 25, or similar storage receptacle, may be mounted at the rear of the foot plate 14 and extend across the later width of the main frame.

A seat 28 is mounted across the main frame, between the side bars 12*a*. The seat 28 comprises an upper seat portion 28*a* comprising an arch shaped back rest 30, a rectangular base 32 extending generally orthogonally (forward) from the bottom edge of the back rest 30, and generally triangular opposing side panels 34 that extend from the front edge of the base 32 to the top of the back rest 30. A rigid, U-shaped support member 36 extends around the arched peripheral edge of the back rest 30, the U-shaped support member 36 having a free end terminating at a lower end of each of the side panels 34. The seat 28 further comprises a lower seat portion in the form of a flexible leg rest 28b. The leg rest 28b comprises a generally U-shaped flexible panel 37 that extends downwardly at an angle from the front edge of the seat base 32, and has a shallow end wall 38 that tapers from its widest section at the centre of the curved part of the panel 37 to a point at the front edge of the seat base 32. In an alternative exemplary embodiment, the panel 37 may be substantially rigid and be hingedly connected to the front edge of the seat base 32. The present invention is not necessarily intended to be limited in this regard, but it is desirable to provide a seat configuration comprising the upper seat portion 28a and the leg rest 28b wherein the leg rest 28b can be folded (at the location where it joins the seat base 32) about a lateral axis so that the leg rest 28b lies against the rear surface of the back rest 30 when the device is in a folded configuration.

The seat 28 is mounted to the main frame by means of a pair of adjustment mechanisms 40, wherein a first adjustment mechanism 40 couples a free end of the support member 36 to a first respective side bar 12a and a second adjustment mechanism 40 couples the other free end of the support member 36 to the other side bar 12a. A second fixed cuff 39 is mounted on each of the side bars 12a, at the upper end of the lower side bar section (i.e. at the upper edge of the lower side bar section, wherein the upper side bar section is telescopically mounted). Thus, it will be appreciated that the upper side bar section can be retracted into the lower side bar section up to the point where the first and second fixed cuffs 23, 39 meet and thereby prevent further retraction. Each adjustment mechanism 40 comprises a link arm 42 in form of an elongate rigid bar having generally circular connection regions at each end. In an alternative exemplary embodiment, the link arm 42 may be split into two parts along at least a portion of its length to allow a separate bassinet to be mounted thereon, as will be described in more detail later. A first connection region of each link arm 42 is rotatably coupled to a respective free end of the support member 36, and the opposing connection region of each link arm 42 is rotatably coupled to a respective second fixed cuff 39. Releasable locking means (not shown) are provided in respect of each rotating coupling at each end of each link arm 42 so as to releasably lock the ink arm in a desired orientation relative to the main frame.

In the stroller configuration illustrated in FIG. 1 of the drawings, the link arm 42 is locked in an orientation whereby it extends forward from the frame (when the device is oriented for use), at a small angle to the longitudinal axis of the side bars 12a, and the seat base 32 is oriented substantially horizontally and generally orthogonal to the longitudinal axis of the link arm 42. In this configuration, a child can sit in the seat 28, facing forwards (relative to the direction of travel of the device) and the stroller can be manually conveyed by a user pushing the handle member 16.

Figure 2:
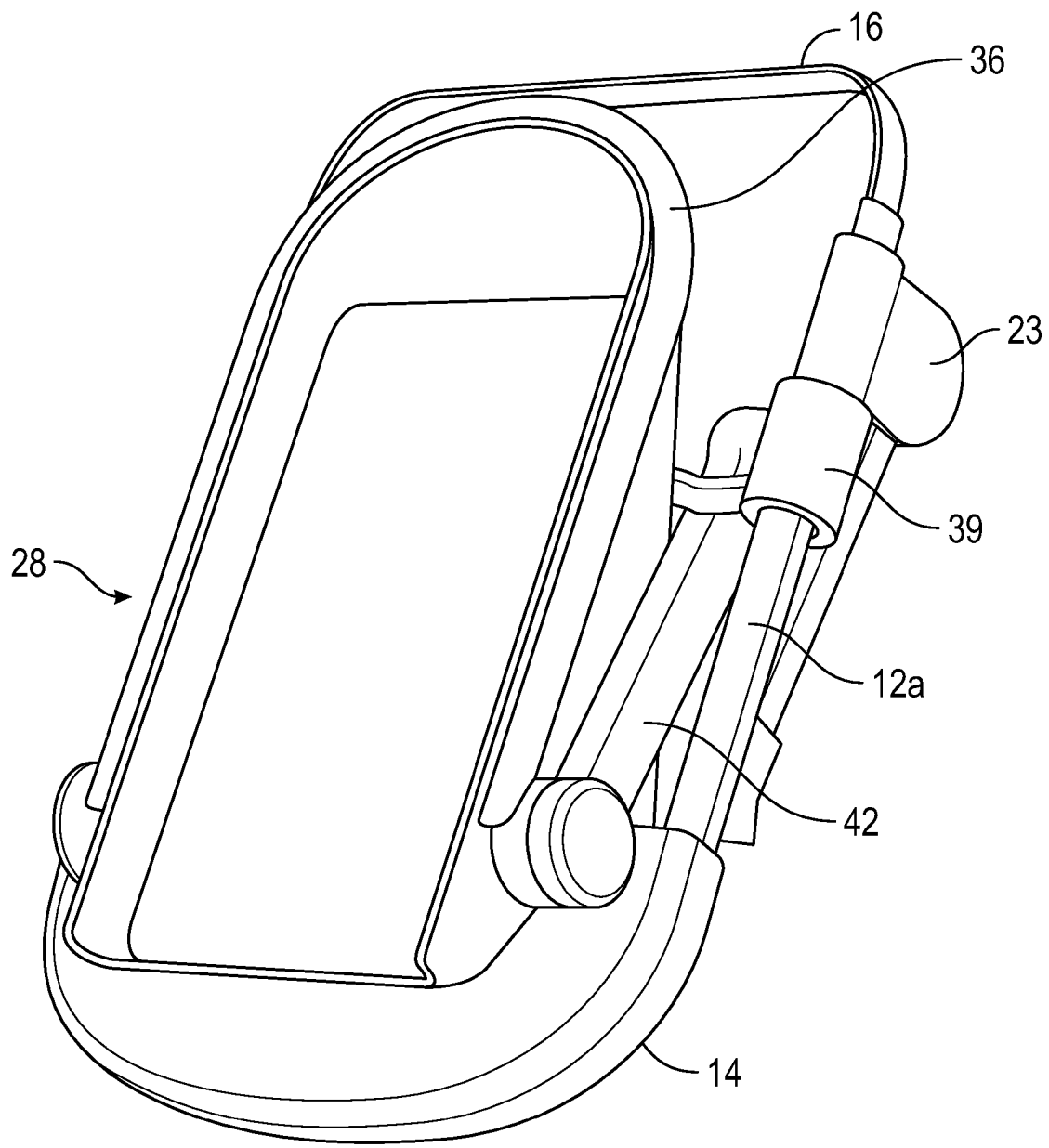
FIG. 2 is a schematic perspective view of the device of FIG. 1 when in the collapsed or folded configuration.
Figure 3C:
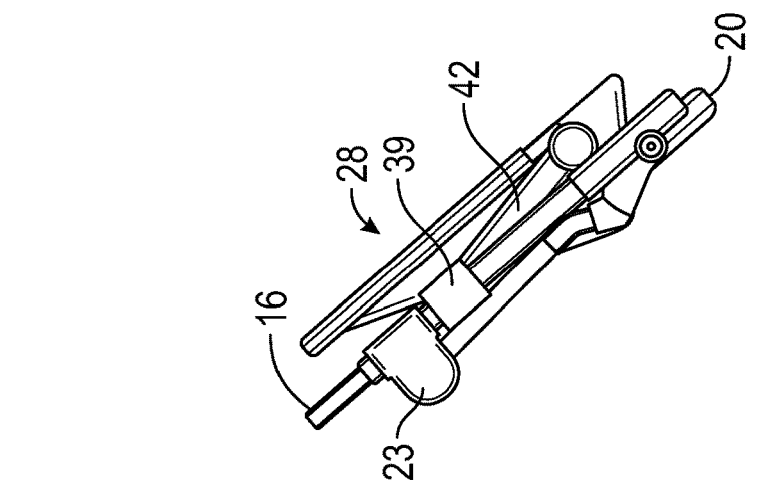
FIGS. 3A to 3C are schematic side views of the device of FIG. 1 illustrating the collapsing or folding process thereof.
Figure 3B:
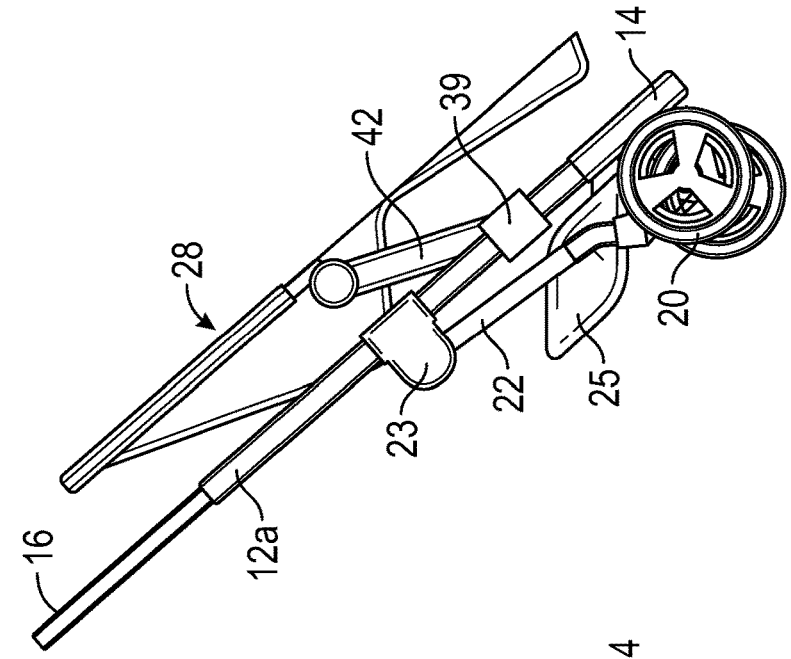
Figure 3A:
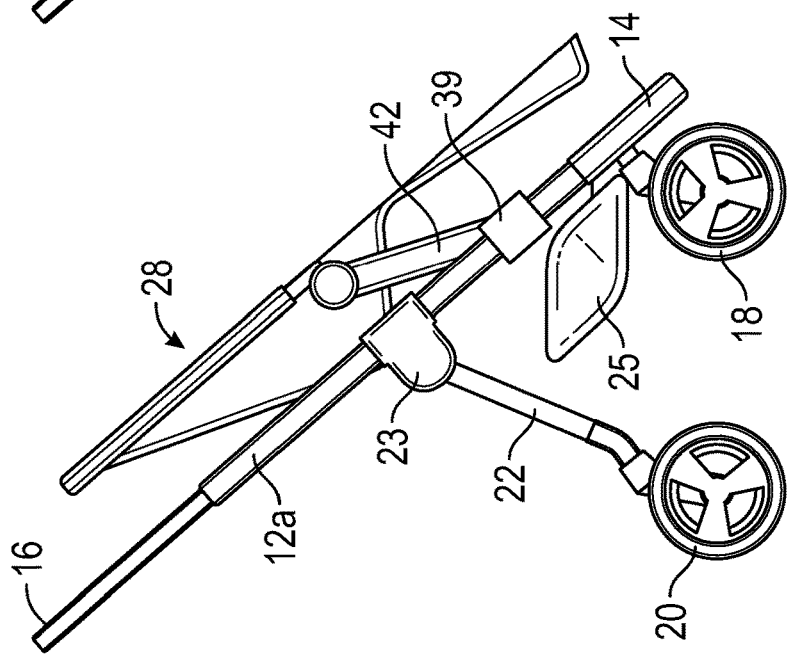

If it is required to fold the stroller for storage or transportation, and referring additionally to FIGS. 3A to 3C of the drawings, the support legs 22 carrying the rear wheels 20 can be released and pivoted (toward the front wheels 18) from the operable position to the folded position as described above (see FIG. 3B). The handle member 16 is released and fully retracted into the upper side bar sections, and the upper side bar sections are released and fully retracted into the respective lower side bar sections (until the first and second fixed cuffs 23, 39 meet). The rotatable couplings at each end of each link arm 42 are released so that the link arms 42 can be rotated to a position substantially parallel and adjacent to a respective side bar 12a, such that the seat 28 lies 'flat' within the main frame. The leg rest 28b folds (at the junction between it and the seat base 32) rearwardly (behind the back rest 30). Finally, the front wheels 18 rotate to lie flat against the rear surface of the foot plate 14, as described above, thus resulting in the collapsed configuration illustrated in FIGS. 2 and 3C of the drawings. It will be appreciated that each of these steps could be done in any convenient order, or could be done substantially simultaneously, via a cable system, having a single release mechanism that releases all of the pivotal and rotatable couplings. The present invention is not necessarily intended to be in any way limited in this regard. It will be appreciated that, in the folded configuration, the dimensions of the device may be such that it complies with IATA regulations on the dimensions (and weight) of cabin baggage, thereby enabling a user to take it in the cabin of an aircraft when travelling, rather than placing it in the hold. However, once again, the present invention is not necessarily intended to be limited in this regard.

Figure 4D:
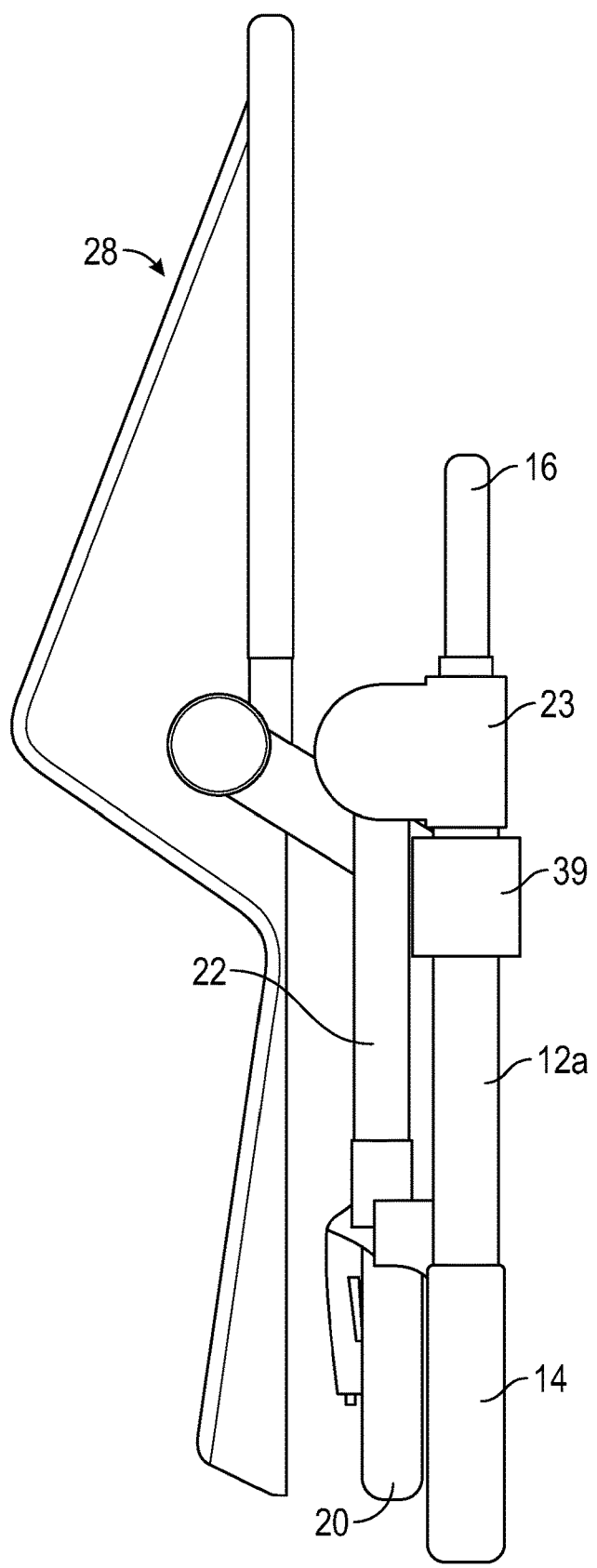
Figure 5A:
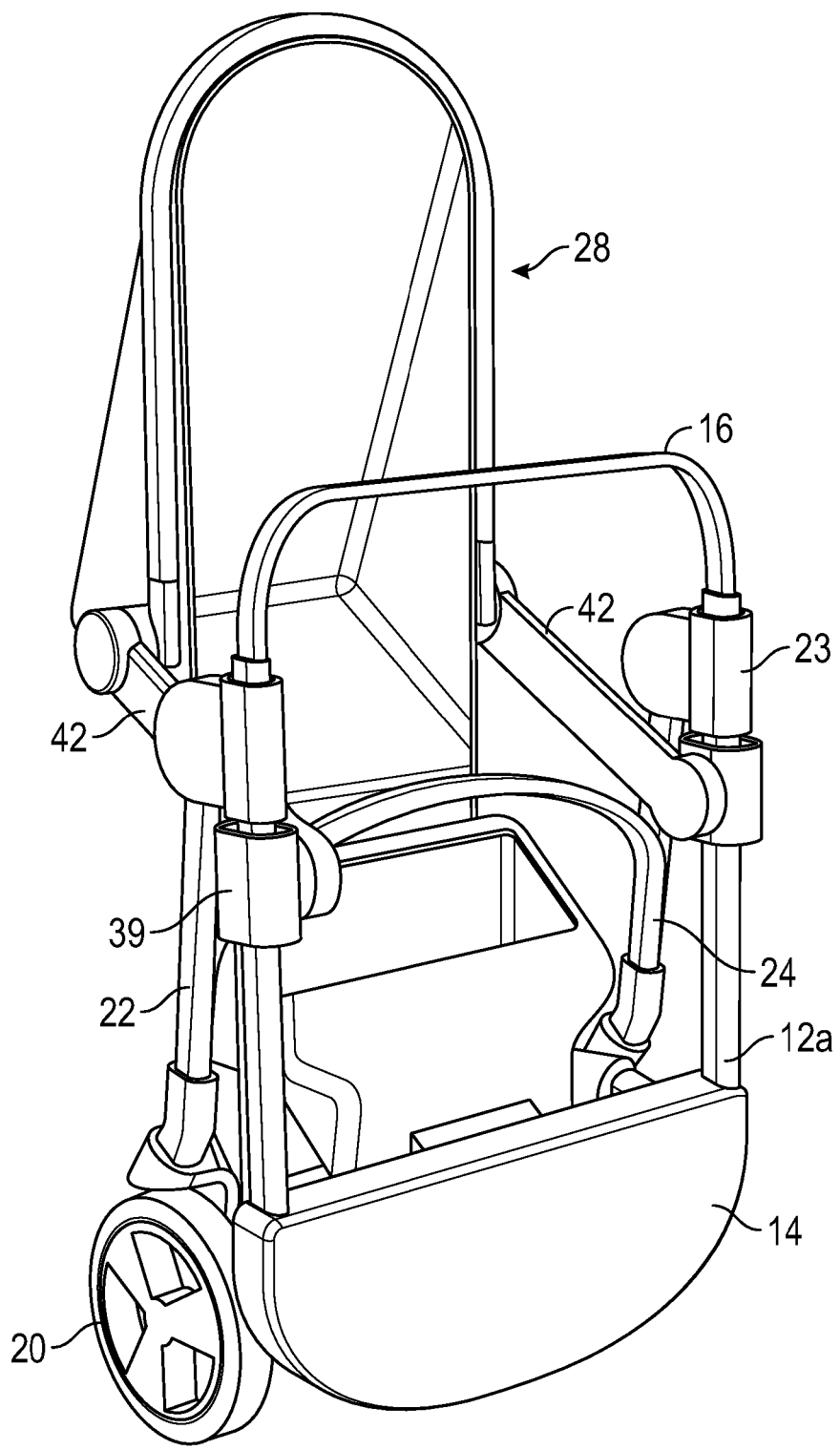
FIG. 5A is a schematic perspective view of a child carrying device according to an exemplary embodiment of the present invention in a child back carrier mode.
Figure 5B:
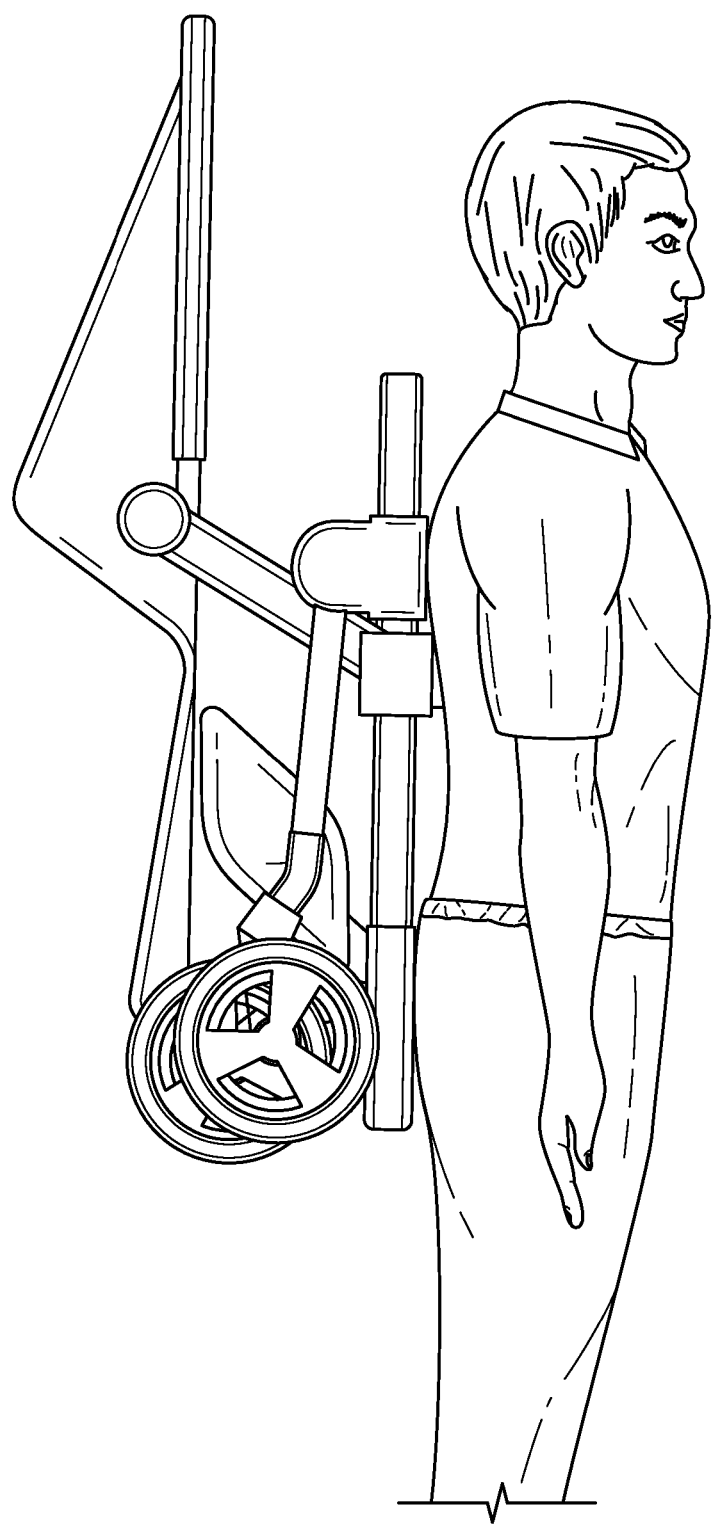
FIG. 5B is a schematic side view of the device of FIG. 5A when in use.

In some circumstances, it may be desirable to use a child back carrier to transport a child, rather than a stroller. The device of this exemplary embodiment of the present invention is designed to be reconfigured into a child back carrier if desired, as will now be described with reference to FIGS. 4A to 4C of the drawings. Starting at FIG. 4A, it can be seen that the device is in the stroller configuration of FIG. 1. The support legs 22 carrying the rear wheels 20 are rotated (toward the front wheels 18) so that they are substantially parallel and adjacent to the respective side bars 12a. The link arms 42 are rotated (at the pivotal couplings) through around 90° such that they extend rearwardly relative to the side bars 12a and at an angle of less than 90° thereto. With the link arms in this position, the seat 28 is now suspended behind the main frame, as shown in FIG. 4B. Finally, the handle member 16 is fully retracted into the upper side bar section and the upper side bar section is fully retracted into the lower side bar section (until the first and second fixed cuffs 23, 39 meet) to arrive at the child back carrier configuration illustrated in FIG. 4C of the drawings. Advantageously, the rear wheels 20 may also 'fold' inward, over the folded front wheels located at the rear of the foot plate 14, as illustrated in FIG. 4D of the drawings. Referring additionally to FIGS. 5A and 5B of the drawings, in this configuration (and when the device is oriented for use), the fully retracted main frame is substantially vertical and the support legs 22 and bracing member 24 are immediately behind it. The seat 28 extends rearwardly of the support legs 22 such that there is a space between the seat and the main frame for receiving a child in the seated position. The front wheels 18 are in the folded position, flat against the rear surface of the foot plate 14, and the rear wheels 20 sit on each side of the foot plate 14, at its rear surface, such that the foot plate 14 acts to protect the user from the wheels. In this configuration, a child can be placed in the seat and the device strapped to a user's back and shoulders (in the manner of a conventional ruck sack or back pack), with the child facing the user's back, for transport. The harness for strapping the device to a user's back and shoulders may be incorporated in the device, or may be provided separately, and the present invention is not necessarily intended to be limited in this regard.

Figure 6A:
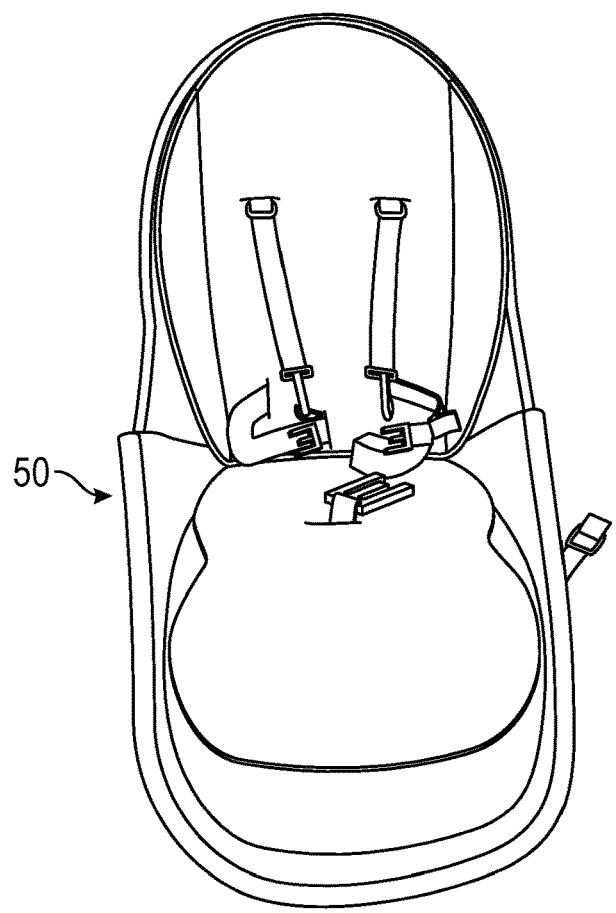
FIGS. 6A and 6B are front and perspective views respectively of a seat liner for use with the device of FIG. 5A.
Figure 6B:
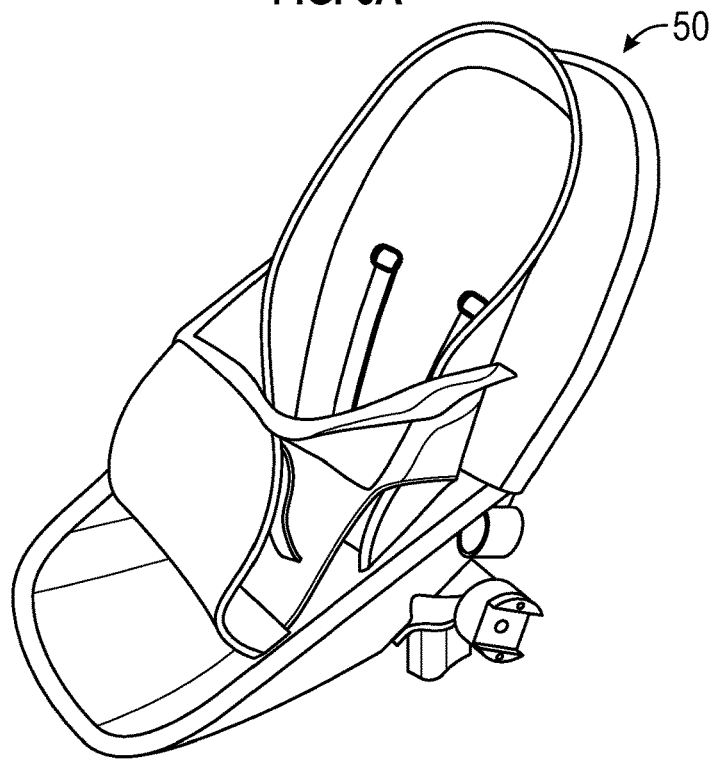

In order to ensure that the child is properly supported when seated in the device in the child back carrier configuration, an adjustable seat liner may be provided. Referring to FIGS. 6A and 6B of the drawings, the seat liner 50 may be provided in two integral parts: a first part configured to line the inner surface of the back rest 30, and a second part configured to line the seat base 32 when the device is configured as a stroller. The second part of the seat liner includes a pair of side straps or panels. When the device is reconfigured for use as a child back carrier, the second part of the seat liner can be folded upward and secured in a sling-like configuration for receiving a child, with a pair of opposing openings being defined at the bottom to accommodate the child's legs. This configuration is particularly advantageous, as it provides additional support and security for the child, and also creates an upright rear support (defined by the first part of the seat liner) to ensure that the child is supported in a comfortable and safe position.

In another embodiment of the present invention, while the seat 1000 is in the back carrier configuration, a selectively removable back support member 90 may be provided, in order to facilitate a change from the back carrier configuration to a sturdy seat for use in the stroller configuration. Referring to FIGS. 9A to 9E of the drawings, the back support member 90 comprises a rigid piece of material, which may be generally rectangular in shape. The support member 90 comprises two opposing planar surfaces, and four edges. The support member 90 is stored underneath said seat 1000 while it is in the back carrier configuration in a storage space [not shown]. This storage space may consist of a pouch or pocket. Alternatively a rail system may be used wherein the support member 90 is slidably received within a storage space defined between two reinforced fabric 'rails', for example, and removable therefrom. The back support member 90 has attached to it a handle 92 near one edge of the member 90, for selectively removing the back support member 90 from the storage location. The handle 92 may comprise a loop of material, secured along one edge of the support member 90 forming a flexible grasping mechanism. In use, the user pulls on the handle 92 in order to extract it from the storage space underneath the seat.

Figure 9C:
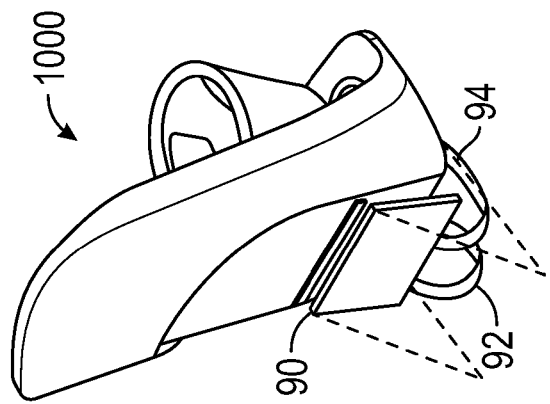
FIGS. 9A to 9E show the use of a back support member for changing the configuration from a back carrier configuration to a stroller configuration.
Figure 9B:
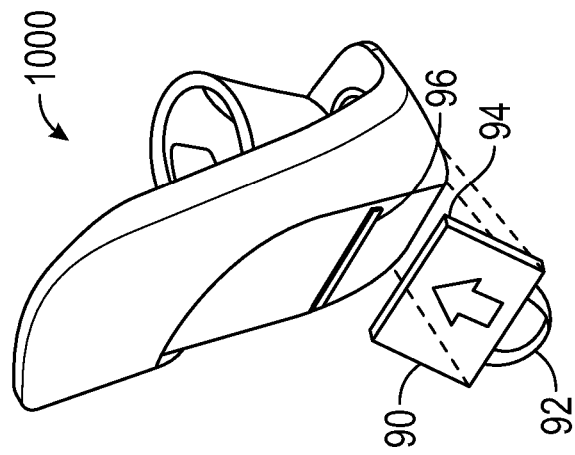
Figure 9A:
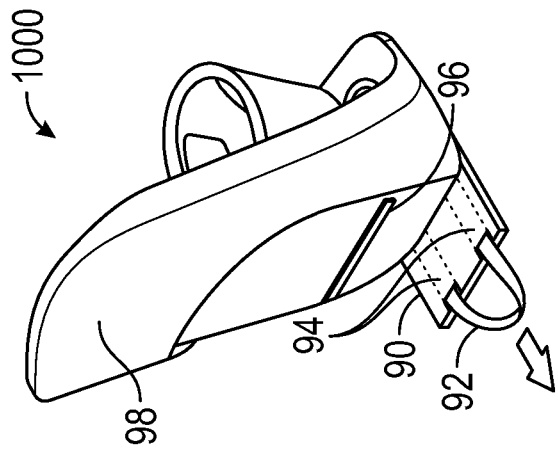
Figure 9E:
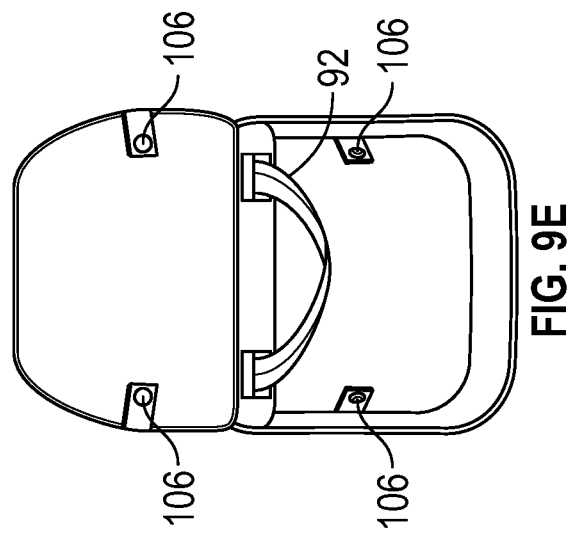
Figure 9D:
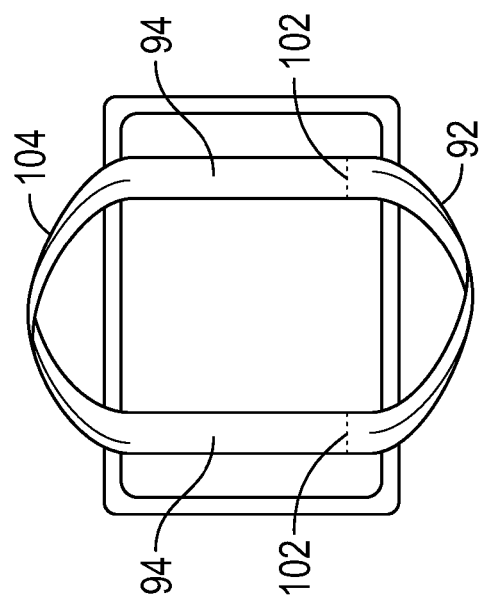

Referring now to FIG. 9D, the back support member 90 is illustrated in more detail, it can be seen that the handle 92 is attached to the back support member at two attachment points 102 near an end edge thereof. Two parallel strap members 94 extend away from the attachment points 102 toward the opposing edge of the back support member 90. These strap members 94 may be attached to the inside of the storage space, to prevent separation of the back support member 9 from the seat when it is in the back carrier configuration. The strap members 94 and two handles 92, 104 may optionally be formed of a single piece of material (e.g. fabric or webbing) forming a pair of handles 92, 104 at opposing edges of the back support member 90. The strap members 94 and handles 92, 104 may be elasticated.

In use, the back support member 90 can be removed from the storage space by pulling on the handle 92. The attachment member 94 to the seat prevents the user from completely separating the back support member 90 from the seat 1000. The attachment points 102 act as a pivot point, so when the back support member 90 is in the pulled out configuration as shown in FIG. 9B of the drawings, the device can then be pivoted from a generally horizontal configuration to a generally vertical configuration. Preferably in the second configuration the support member 90 is substantially parallel to the back portion of the seat 1000. The back support member 90 can then inserted into a pocket 96 on the back of the seat 1000. Once the back support member 90 has been placed in this pocket 96, the pocket 96 can then be secured by a fastening means 106. This fastening means 106 may be popper buttons, or a hook and loop configuration, although other fastening means will be suitable and the invention is not necessarily limited in this regard.

In another exemplary embodiment of the present invention, the back support member 90 may be completely removable from the storage space under the seat. Here, the strap members 94 may end in a second handle 104, not fixed to the seat 1000. The user can therefore separate the back support member 90 from the seat 1000 in order to replace it within the second pocket 96. This is particularly advantageous wherein the rear support member requires replacement or cleaning.

The back support member 90 may advantageously be made of a hard flexible plastic, to allow comfort while providing support. This hard flexible plastic may be corrugated polypropylene or similar, although other materials will be suitable, and the invention is not necessarily intended to be limited in this regard. This configuration is particularly advantageous as it provides additional back support for the child in the back carrier mode, and allows for a sturdier seat in the stroller mode, whilst optimising the weight and size of the overall device.

Figure 7B:
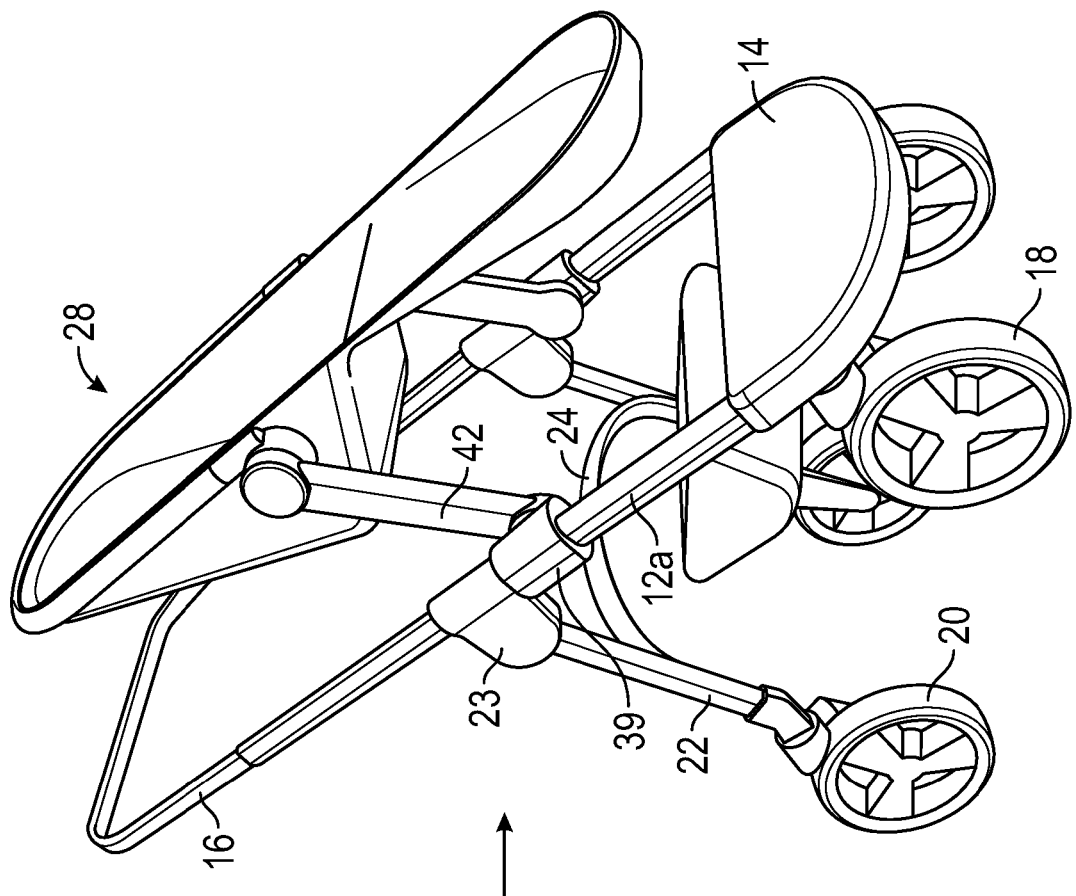
FIGS. 7A and 7B are schematic views of the device of FIG. 1 illustrating the reconfiguration process thereof from a stroller to a high chair.
Figure 7A:
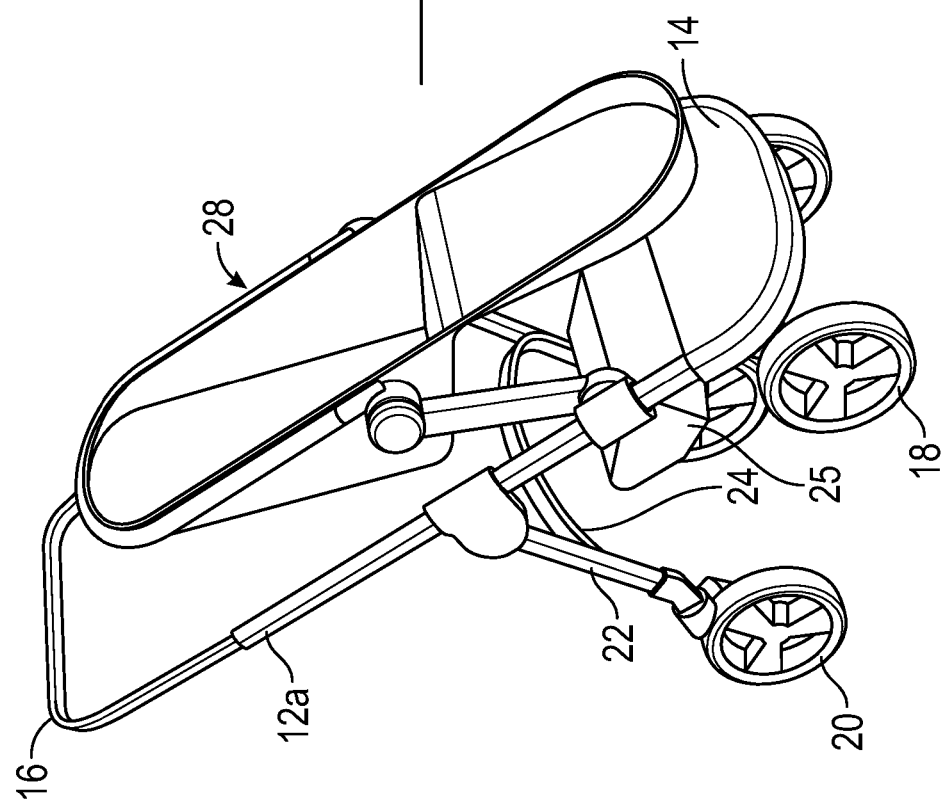

Additionally, the device according to this exemplary embodiment of the present invention is designed to be reconfigured for use as a high chair, as will now be described with reference to FIGS. 7A and 7B of the drawings. In FIG. 7A of the drawings, the device is once again illustrated in the stroller configuration, with the main frame fully extended, and the link arms 42 extending substantially vertically, at a small angle to the longitudinal axis of the side bars 12a. Referring additionally to FIG. 7B of the drawings, for the high chair mode, at least the upper side bar section is fully retracted (so the first and second fixed cuffs 23, 39 abut each other) and the link arms are rotated so that they still extend from the front of the main frame, but at a larger angle relative to the longitudinal axis of the side bars 12a than in the stroller configuration.

It can be seen from the above description that the orientation of the link arms 42 determines, to a large extent, the configuration of the device. Thus, in the stroller mode, the link arms extend forward of the main frame but at a small angle relative to the longitudinal axis of the side bars 12a (with the main frame fully extended), in the high chair mode, the link arms 42 still extend forward of the main frame but at a larger angle relative to the longitudinal axis of the side bars 12a (with the upper side bar section of the main frame retracted), whereas in the child back carrier mode, the link arms extend rearwardly of the main frame at quite a large angle relative to the longitudinal axis of the side bars 12a (with the main frame fully retracted and the rear wheels and their support legs in the folded configuration). Finally, in the collapsed or folded configuration, the link arms 42 are substantially parallel and adjacent to the side bars 12a. The rotatable couplings may be configured to facilitate each of these four discrete positions, rather than being freely rotatable, to ensure that the user achieves the correct orientation in each case.

Figure 8:
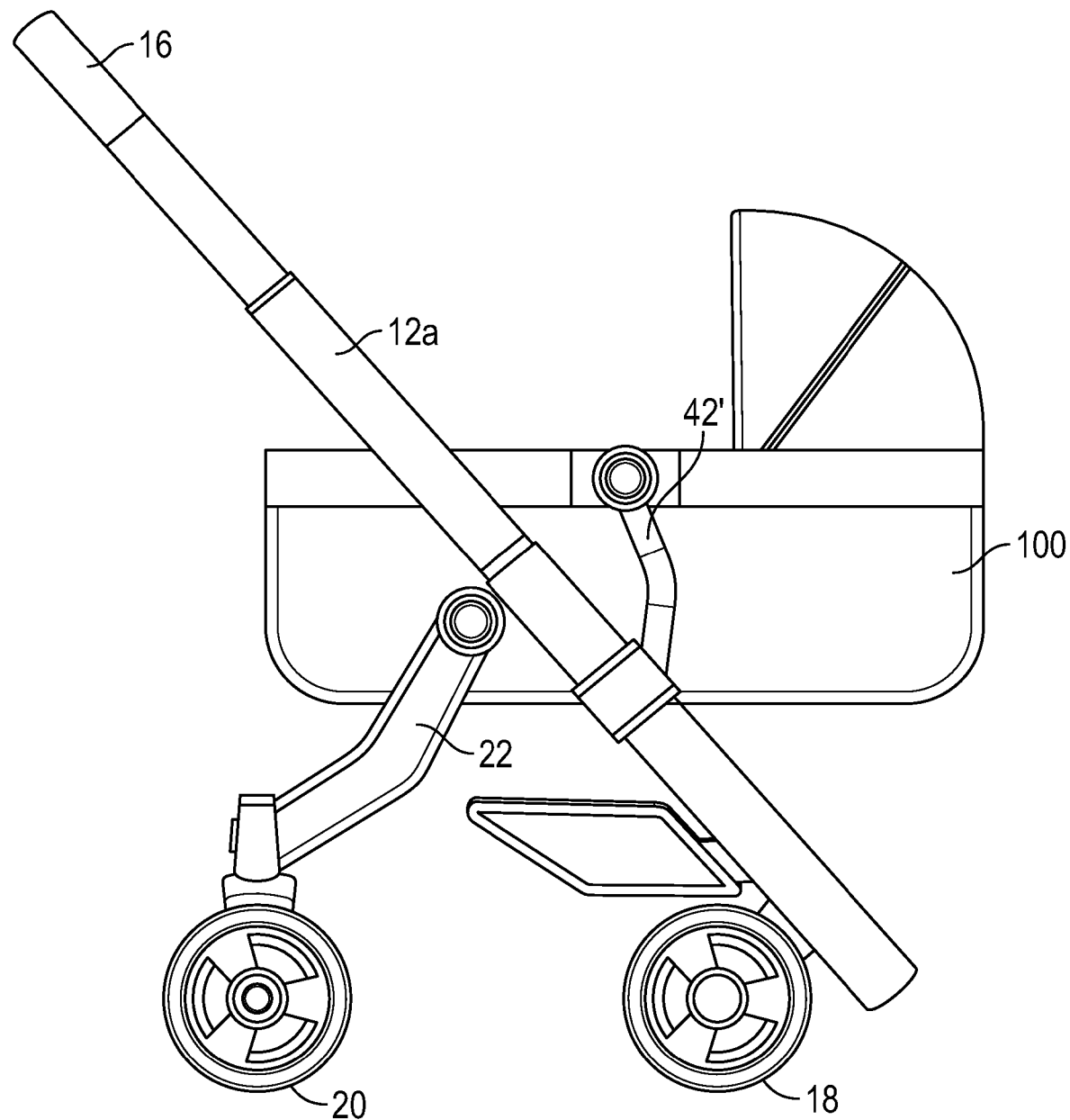
FIG. 8 shows a stroller with a bassinet in place of a seat.

It will be appreciated by a person skilled in the art, from the foregoing description, that modifications and variations can be made to the described embodiments, without departing from the scope of the invention as defined by the appended claims. For example, and referring to FIG. 8 of the drawings, the seat (28—FIG. 1) may be removable and a bassinet 100 may instead be mounted between the link arms 42'. To this end, each link arm 42' may be split into two parts along at least a portion of its length so that a respective mounting member provided on a side edge of the bassinet 100 can be received therein.

The invention claimed is:

1. A child carrying device comprising a frame mounted on a set of wheels or castors to enable the device to be manually conveyed thereon, and a seat mounted on said frame, said device including adjustment means for selectively reconfiguring the device such that it is operable as any one of a stroller, a child back carrier and a high chair;
wherein said frame has an upper end and a lower end and is oriented at a rearward angle from said lower to said upper end when the device is oriented for use, with a handle member being mounted at said upper end;
wherein said handle member is selectively extendible and retractable relative to said frame;
wherein a planar foot plate is provided at a bottom end of said frame; and wherein a first one or more front wheels or castors is mounted at said lower end of said frame;
the device comprising a pair of rear wheels or castors, each said rear wheel or castor being mounted at a distal end of a respective support leg, wherein each support leg is coupled at the other end to a respective side of the frame, at a first intermediate location along its length, and extending downwardly and rearwardly therefrom at an angle to the longitudinal axis thereof when in an operable configuration;
wherein said frame comprises a pair of parallel and spaced apart side bars, and each said support leg is coupled to a respective side bar by means of a fixed cuff member at said first intermediate location along its length.

2. The device according to claim 1, wherein said seat is mounted to said frame by means of a pair of link arms, each link arm being rotatably coupled at one end thereof to a respective side of the seat and rotatably coupled at the other end thereof to a respective side of the frame at a second intermediate location along its length, and wherein said second intermediate location is lower than said first intermediate location on said frame.

3. The device according to claim 2, wherein said frame comprises the pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto, a first fixed cuff member is mounted at said open tubular end of each said first elongate section and the other end of a respective link arm is rotatably connected to each said first fixed cuff member, and wherein the device comprising the pair of rear wheels or castors, each said rear wheel or castor being mounted at the distal end of the respective support leg and each support leg being coupled at the other end to a second fixed cuff member mounted on the second elongate section of a respective side bar of said frame and extending downwardly and rearwardly therefrom at an angle to the longitudinal axis thereof when in an operable configuration, said second fixed cuff defining the maximum amount by which said second elongate section can be retracted relative to said first elongate section.

4. A child carrying device comprising a frame mounted on a set of wheels or castors to enable the device to be manually conveyed thereon, and a seat mounted on said frame, said device including adjustment means for selectively reconfiguring the device such that it is operable as any one of a stroller, a child back carrier and a high chair;
wherein said frame has an upper end and a lower end and is oriented at a rearward angle from said lower to said upper end when the device is oriented for use, with a handle member being mounted at said upper end;
wherein said handle member is selectively extendible and retractable relative to said frame;
wherein a planar foot plate is provided at a bottom end of said frame; and wherein a first one or more front wheels or castors is mounted at said lower end of said frame;
the device comprising a pair of rear wheels or castors, each said rear wheel or castor being mounted at a distal end of a respective support leg, wherein each support leg is coupled at the other end to a respective side of the frame, at a first intermediate location along its length, and extending downwardly and rearwardly therefrom at an angle to the longitudinal axis thereof when in an operable configuration;
wherein a bracing member extends between said support legs;
and wherein said bracing member is of a substantially inverted U shape.

5. A child carrying device comprising a frame mounted on a set of wheels or castors to enable the device to be manually conveyed thereon, and a seat mounted on said frame, wherein said frame comprises a pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto, wherein one or more rear wheels or castors is provided at a distal end of a respective one or more support legs, said one or more support legs being coupled at the other end to the frame and extending downwardly therefrom at an angle to the longitudinal axis thereof when in an operable configuration, the or each support leg being pivotally coupled to the frame and configured to be selectively pivoted from said operable configuration to a second configuration in which the support leg(s) is/are substantially parallel and adjacent to a longitudinal dimension of the frame, and wherein said seat is mounted to said frame by means of a pair of link arms, each link arm being rotatably coupled at one end thereof to a respective side of the seat and rotatably coupled at the other end thereof to an elongate section of a respective side bar of the frame, said device being selectively reconfigurable such that it is operable in any one of a stroller, a child back carrier and a high chair mode, wherein in said stroller mode, said support leg(s) is/are in said operable mode, said second elongate section of each side bar is extended relative to the respective first elongate section, and said link arms extend from the front of the frame at a first angle relative to its longitudinal axis; in said back carrier mode, said support leg(s) is/are in said second configuration, said second elongate section of each side bar of said frame is fully retracted relative to the first elongate section and said link arms extend rearwardly from said frame at an angle to the longitudinal axis thereof; and in said high chair mode, said support leg(s) is/are in said operable mode, said second elongate section of each side bar of said frame is retracted relative to said first elongate section, and said link arms extend from the front of the frame at a second angle, greater than the first angle, relative to the longitudinal axis thereof.

6. A child carrying device comprising a frame mounted on a set of wheels or castors to enable the device to be manually conveyed thereon, and a seat mounted on said frame, said device including adjustment means for selectively reconfiguring the device such that it is operable as any one of a stroller, a child back carrier and a high chair;

wherein said seat comprises a backrest, a seat portion and a seat liner, said seat liner comprising first and second integral portions, said first seat liner portion being configured to line the backrest and said second seat liner portion being configured to line said seat portion when the device is operable as a stroller, the seat liner further comprising a pair of strap members connected to said second seat liner portion and being configured to be releasably connected to said first seat liner portion when said device is operable as a child back carrier to form a sling-like seat for receiving a child.

7. The device according to claim 6 wherein said seat additionally comprises a selectively removable back support member, a storage space beneath said seat for selectively receiving said back support member when not configured for use, and a pocket on the rear of said seat for selectively receiving said back support member when configured for use;

said back support member comprising a substantially flat panel member, a handle hingedly affixed to said panel member, and two substantially parallel connecting members; wherein the back support member being movable between a storage configuration in which it is stored in a storage space beneath the seat and a support configuration in which said support member is affixed inside said pocket.

8. A child carrying device comprising a frame mounted on a set of wheels or castors to enable the device to be manually conveyed thereon, and a seat mounted on said frame, wherein said frame comprises a pair of parallel and spaced apart side bars, each side bar comprising a first elongate section having an open tubular end, and a second elongate section, wherein said second elongate section is telescopically and slidably mounted, in longitudinal alignment, in said first section so as to be selectively retracted and extended relative thereto, wherein one or more rear wheels or castors is provided at a distal end of a respective one or more support legs, said one or more support legs being coupled at the other end to the frame and extending downwardly therefrom at an angle to the longitudinal axis thereof when in an operable configuration, the or each support leg being pivotally coupled to the frame and configured to be selectively pivoted from said operable configuration to a second configuration in which the support leg(s) is/are substantially parallel and adjacent to a longitudinal dimension of the frame, and wherein said seat is mounted to said frame by means of a pair of link arms, each link arm being rotatably coupled at one end thereof to a respective side of the seat and rotatably coupled at the other end thereof to an elongate section of a respective side bar of the frame, said device being selectively reconfigurable such that it is operable in either a stroller or a child back carrier mode, wherein in said stroller mode, said support leg(s) is/are in said operable mode, said second elongate section of each side bar is extended relative to the respective first elongate section, and said link arms extend from the front of the frame at a first angle relative to its longitudinal axis;

and in said back carrier mode, said support leg(s) is/are in said second configuration, said second elongate section of each side bar of said frame is fully retracted relative to the first elongate section and said link arms extend rearwardly from said frame at an angle to the longitudinal axis thereof.

* * * * *